United States Patent
Gross et al.

(10) Patent No.: US 12,462,158 B2
(45) Date of Patent: Nov. 4, 2025

(54) METHOD AND SYSTEM FOR TRAINING A NEURAL NETWORK

(71) Applicant: THE ROYAL INSTITUTION FOR THE ADVANCEMENT OF LEARNING/MCGILL UNIVERSITY, Montréal (CA)

(72) Inventors: Warren J. Gross, Côte-St-Luc (CA); Amir Ardakani, Montreal (CA); Arash Ardakani, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 1002 days.

(21) Appl. No.: 17/180,340

(22) Filed: Feb. 19, 2021

(65) Prior Publication Data

US 2021/0256389 A1 Aug. 19, 2021

Related U.S. Application Data (60) Provisional application No. 62/978,562, filed on Feb. 19, 2020.

(51) Int. Cl.
| | |
|---|---|
| *G06N 3/084* | (2023.01) |
| *G06N 3/045* | (2023.01) |
| *G06N 3/047* | (2023.01) |
| *G06N 3/048* | (2023.01) |
| *G06N 3/063* | (2023.01) |

(52) U.S. Cl.
CPC ............. *G06N 3/084* (2013.01); *G06N 3/047* (2023.01); *G06N 3/048* (2023.01)

(58) Field of Classification Search
CPC ......... G06N 3/084; G06N 3/047; G06N 3/048
See application file for complete search history.

(56) References Cited

U.S. PATENT DOCUMENTS

| | | | |
|---|---|---|---|
| 2017/0286830 A1* | 10/2017 | El-Yaniv | G06N 3/045 |
| 2019/0318405 A1* | 10/2019 | Hu | G06V 20/00 |
| 2021/0342678 A1* | 11/2021 | Mostafa | G06N 3/063 |

OTHER PUBLICATIONS

M. Courbariaux et al., "Binarized Neural Networks: Training Deep Neural Networks with Weights and Activations Constrained to +1 or −1," arXiv preprint arXiv:1602.02830 (2016). (Year: 2016).*

(Continued)

*Primary Examiner* — Kamran Afshar
*Assistant Examiner* — Steven Phung
(74) *Attorney, Agent, or Firm* — NORTON ROSE FULBRIGHT CANADA LLP (57) ABSTRACT

There is provided a computer-implemented method of training a neural network, the neural network comprising a plurality of interconnected nodes arranged in a plurality of layers and having a plurality of weights associated therewith. The method comprises obtaining, at a computing device, a training dataset from a database, performing, at the computing device, a forward propagation on the training dataset to produce an output of the neural network, and performing, at the computing device, a backward propagation on the output of the neural network to update the plurality of weights, the backward propagation performed using an estimation of a polarity and a neutrality of gradients of the neural network.

19 Claims, 8 Drawing Sheets

(56) References Cited

OTHER PUBLICATIONS

M. Rastegari, V. Ordonez, J. Redmon, and A. Farhadi, "Xnor-net: Imagenet classification using binary convolutional neural networks," in European Conference on Computer Vision, 2016, pp. 525-542. (Year: 2016).*

W. Wen, C. Xu, F. Yan, C. Wu, Y. Wang, Y. Chen, and H. Li, "Terngrad: Ternary gradients to reduce communication in distributed deep learning," in Advances in neural information processing systems, 2017, pp. 1509-1519. (Year: 2017).*

A. Ardakani, F. Leduc-Primeau, N. Onizawa, T. Hanyu, and W. J. Gross, "VLSI implementation of deep neural network using integral stochastic computing," IEEE Transactions on Very Large Scale Integration (VLSI) Systems, vol. 25, No. 10, pp. 2688-2699, 2017. (Year: 2017).*

N. Nazari et al., "TOT-Net: An Endeavor Toward Optimizing Ternary Neural Networks," 2019 22nd Euromicro Conference on Digital System Design (DSD), Kallithea, Greece, 2019, pp. 305-312, doi: 10.1109/DSD.2019.00052. (Year: 2019).*

S. Han, H. Mao, and W. J. Dally, "Deep compression: Compressing deep neural networks with pruning, trained quantization and huffman coding," arXiv preprint arXiv:1510.00149, 2015.

M. Courbariaux, Y. Bengio, and J.-P. David, "Training deep neural networks with low precision multiplications," arXiv preprint arXiv:1412.7024.

A. Ardakani, C. Condo, and W. J. Gross, "Sparsely-connected neural networks: towards efficient visi implementation of deep neural networks," in 5th International Conference on Learning Representations (ICLR), Apr. 2017.

S. Liu, H. Jiang, L. Liu, and J. Han, "Gradient descent using stochastic circuits for efficient training of learning machines," IEEE Transactions on Computer-Aided Design of Integrated Circuits and Systems, vol. 37, No. 11, pp. 2530-2541, 2018.

I. Hubara, M. Courbariaux, D. Soudry, R. El-Yaniv, and Y. Bengio, "Binarized neural networks," in Advances in neural information processing systems, 2016, pp. 4107-4115.

W. Wen, C. Xu, F. Yan, C. Wu, Y. Wang, Y. Chen, and H. Li, "Terngrad: Ternary gradients to reduce communication in distributed deep learning," in Advances in neural information processing systems, 2017, pp. 1509-1519.

I. Hubara, M. Courbariaux, D. Soudry, R. El-Yaniv, and Y. Bengio, "Quantized neural networks: Training neural networks with low precision weights and activations," The Journal of Machine Learning Research, vol. 18, No. 1, pp. 6869-6898, 2017.

M. Rastegari, V. Ordonez, J. Redmon, and A. Farhadi, "Xnor-net: Imagenet classification using binary convolutional neural networks," in European Conference on Computer Vision, 2016, pp. 525-542.

S. Darabi, M. Belbahri, M. Courbariaux, and V. P. Nia, "Bnn+: Improved binary network training," arXiv preprint arXiv:1812.11800, 2018.

Y. Liu, S. Liu, Y. Wang, F. Lombardi, and J. Han, "A stochastic computational multi-layer perceptron with backward propagation," IEEE Transactions on Computers, vol. 67, No. 9, pp. 1273-1286, 2018.

A. Ardakani, F. Leduc-Primeau, N. Onizawa, T. Hanyu, and W. J. Gross, "VLSI implementation of deep neural network using integral stochastic computing," IEEE Transactions on Very Large Scale Integration (VLSI) Systems, vol. 25, No. 10, pp. 2688-2699, 2017.

S. C. Smithson, K. Boga, A. Ardakani, B. H. Meyer, and W. J. Gross, "Stochastic computing can improve upon digital spiking neural networks," in 2016 IEEE International Workshop on Signal Processing Systems (SiPS). IEEE, 2016, pp. 309-314.

K. Kim, J. Kim, J. Yu, J. Seo, J. Lee, and K. Choi, "Dynamic energy accuracy trade-off using stochastic computing in deep neural networks," in 2016 53nd ACM/EDAC/IEEE Design Automation Conference (DAC). IEEE, 2016, pp. 1-6.

A. Ren, Z. Li, C. Ding, Q. Qiu, Y. Wang, J. Li, X. Qian, and B. Yuan, "Sc-donn: Highly-scalable deep convolutional neural network using stochastic computing," ACM SIGOPS Operating Systems Review, vol. 51, No. 2, pp. 405-418, 2017.

A. Ardakani, Z. Ji, A. Ardakani, and W. Gross, "The synthesis of xnor recurrent neural networks with stochastic logic," in Advances in Neural Information Processing Systems 32, 2019, pp. 8442-8452.

A. Zhakatayev, S. Lee, H. Sim, and J. Lee, "Sign-magnitude sc: getting 10x accuracy for free in stochastic computing for deep neural networks," in 2018 55th ACM/ESDA/IEEE Design Automation Conference (Dac), IEEE, 2018, pp. 1-6.

B. D. Brown and H. C. Card, "Stochastic neural computation. i. computational elements," IEEE Transactions on computers, vol. 50, No. 9, pp. 891-905, 2001.

J. Li. A. Ren, Z. Li, C. Ding, B. Yuan, Q. Qiu, and Y. Wang, "Towards acceleration of deep convolutional neural networks using stochastic computing," in 2017 22nd Asia and South Pacific Design Automation Conference (ASP-DAC). IEEE, 2017, pp. 115-120.

A. Ren, Z. Li, Y. Wang, Q. Qiu, and B. Yuan, "Designing reconfigurable large-scale deep learning systems using stochastic computing," in 2016 IEEE International Conference on Rebooting Computing (ICRC). IEEE, 2016, pp. 1-7.

* cited by examiner

FIG. 6

METHOD AND SYSTEM FOR TRAINING A NEURAL NETWORK

CROSS REFERENCE TO RELATED APPLICATIONS

This patent application claims priority of U.S. provisional Application Ser. No. 62/978,562, filed on Feb. 19, 2020, the entire contents of which are hereby incorporated by reference.

TECHNICAL FIELD

The present disclosure relates to the field of artificial neural networks, and more particularly to devices, systems, and methods for training neural networks.

BACKGROUND OF THE ART

Deep learning, and more particularly deep neural networks (DNNs), has gone through a recent rise in popularity, achieving state-of-the-art results in various fields. Neural networks can learn tasks and features by processing data, which is known as training. Once properly trained, neural networks can process data for various applications (e.g., semiconductor fabrication, speech processing, language translation, face recognition, and the like) and deep learning offers the promise of intelligent devices that are able to perceive, reason, and take intuitive actions. However, training of neural networks is a computationally intensive and complex task that can use a large amount of processing resources and is generally considered to be time consuming. The rising adoption of deep learning techniques has thus motivated the search for low-cost and high-speed software and hardware solutions for deployment on smart devices. While the focus has lately been on reducing complexity of inference in DNNs, enabling low-complexity on-chip learning remains an issue. There is therefore room for improvement.

SUMMARY

In accordance with a first broad aspect, there is provided a computer-implemented method of training a neural network, the neural network comprising a plurality of interconnected nodes arranged in a plurality of layers and having a plurality of weights associated therewith. The method comprises obtaining, at a computing device, a training dataset from a database, performing, at the computing device, a forward propagation on the training dataset to produce an output of the neural network, and performing, at the computing device, a backward propagation on the output of the neural network to update the plurality of weights, the backward propagation performed using an estimation of a polarity and a neutrality of gradients of the neural network.

In accordance with a second broad aspect, there is provided an electronic device for training a neural network, the neural network comprising a plurality of interconnected nodes arranged in a plurality of layers and having a plurality of weights associated therewith. The electronic device comprises at least one processing unit and a non-transitory memory communicatively coupled to the at least one processing unit and comprising computer-readable program instructions executable by the at least one processing unit for obtaining a training dataset, performing a forward propagation on the training dataset to produce an output of the neural network, and performing a backward propagation on the output of the neural network to update the plurality of weights, the backward propagation performed using an estimation of a polarity and a neutrality of gradients of the neural network.

In accordance with a third broad aspect, there is provided a non-transitory computer readable medium having stored thereon program code executable by at least one processor for a non-transitory computer readable medium having stored thereon program code executable by at least one processor for obtaining a training dataset from a database, performing a forward propagation on the training dataset to produce an output of a neural network, the neural network comprising a plurality of interconnected nodes arranged in a plurality of layers and having a plurality of weights associated therewith, and performing a backward propagation on the output of the neural network to update the plurality of weights, the backward propagation performed using an estimation of a polarity and a neutrality of gradients of the neural network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Herein described are methods and systems for training artificial neural networks, and more particularly for performing forward and backward propagation (i.e. both inference and training phases) of neural networks using binary or ternary operations. As will be described further below, the systems and methods described herein may apply to both conventional neural networks and stochastic computing-based neural networks (referred to herein as SC-based NNs or SCNNs).

Conventional neural networks referred to herein may include, but are not limited to, Feedforward Neural Networks, Deep Belief Neural Networks, Convolutional Neural Networks (CNNs), Recurrent Neural Networks (RNNs), Transformers, Multilevel perceptron, Transducer, restricted Boltzmann machines (RBMs), Auto encoders, Generative adversarial networks, Residual networks, Long Short-Term Memory, and Gated Recurrent Units.

As known to those skilled in the art, SCNNs have been proposed as a low-cost solution for hardware implementation of neural networks. SCNNs may be achieved by binarizing DNNs using stochastic computing (SC). In some embodiments, SCNNs may offer low-cost implementations (in terms of power consumption and resource utilization) compared to the conventional binary-radix implementations of DNNs. Furthermore, SC-based architectures may be more robust against soft errors (i.e., bit flips) than non SC-based architectures. SC-based NNs may be suitable for application-specific integrated circuit (ASIC) and field-programmable fate array (FPGA) implementations of DNNs where power and resource efficiency are of paramount importance. As a result, SC has been used to implement a wide variety of DNNs including, but not limited to, spiking neural networks, fully-connected neural networks (FCNNs), restricted Boltzmann machines (RBMs), convolutional neural networks (CNNs), and recurrent neural networks (RNNs). Even though SC-based implementations of neural networks (i.e. SCNNs) have a significantly smaller footprint compared to their binary-radix counterpart, SC-based implementations require a long stochastic sequence length to compensate for the accuracy loss of SC and provide a comparable accuracy performance with respect to state-of-the art models. SCNNs therefore suffer from high computational latency and large energy consumption.

Using the methods and systems described herein, both the inference and training processes of neural networks can be performed on a small sequence length (e.g., a sequence length of 16) using binary or ternary operations. Using binary or ternary operations, the inference and training processes may even be performed on the minimum possible sequence length (i.e., a sequence length of 1). This may in turn reduce the area-complexity of the training stage, enabling low-cost on-chip learning on dedicated hardware. As such, the proposed methods and systems may be used to replace high-precision multipliers (e.g., 16-bit fixed-point multipliers) in neural network training with ternary operators, while maintaining comparable accuracy. Neural networks may accordingly be directly trained (i.e. without any preprocessing) and any suitable machine learning (ML) technique, including, but not limited to, the dropout regularization technique, may be applied to a neural network trained using the methods described herein.

In one embodiment and as will be discussed further below, it is proposed herein to perform forward propagation using high-precision operations for conventional neural networks and using binarized neural network parameters for SCNNs. For both conventional neural networks and SCNNs, it is proposed herein to perform backward propagation using binary or ternary operations. More specifically and as will be discussed further below, the polarity and neutrality of gradients is estimated using two-bit ternary values (i.e., $\{-1, 0, 1\}$) when performing backward propagation computations.

An SC-based neural network using a stochastic stream representation, and particularly combining different stochastic representations to increase accuracy of computations in the SC domain, is also proposed. Binary multiplication may then be used to perform ternary operations of the combined SC representations (and it is therefore proposed herein to replace ternary operations with binary operations during forward propagation).

Figure 1:
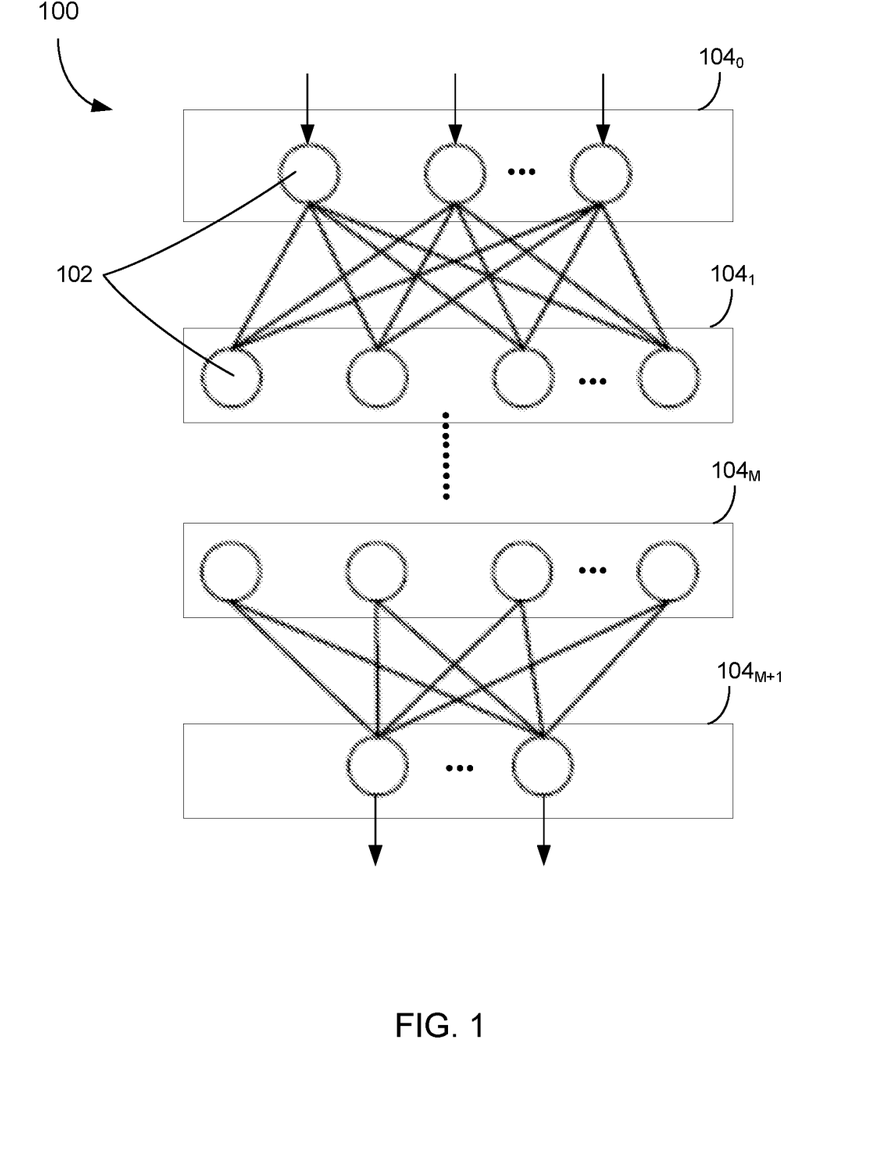
FIG. 1 is a schematic diagram of an example neural network, in accordance with an illustrative embodiment.

Referring to FIG. 1, an example diagram of a neural network 100 will now be described. The neural network 100 comprises a plurality of nodes (or neurons) 102 structured in a plurality of parallel layers $104_0, 104_1, \ldots, 104_M, 104_{M+1}$. The layers $104_0, 104_1, \ldots, 104_M, 104_{M+1}$ include an input layer $104_0$ used to train the neural network 100 and an output layer $104_{M+1}$ that provides the output (not shown) of the neural network 100.

The goal of training neural networks, such as the neural network 100, is optimization of weight parameters in each layer $104_0, 104_1, \ldots, 104_M, 104_{M+1}$. For this purpose, each one of the nodes 102 contains (i.e. implements) functions that perform forward and backward propagation computations. As understood by those skilled in the art, forward propagation refers to the calculation and storage of intermediate variables (including outputs) for the neural network 100 in order, from the input layer $104_0$ to the output layer $104_{M+1}$. Specifically, a training dataset (obtained from a database or other suitable storage means) is input at the input layer $104_0$ and propagated through the network 100, the output of each layer $104_1, \ldots, 104_M$ is sequentially computed, and an output is finally produced at the output layer $104_{M+1}$. In the forward propagation stage, internal weights (not shown) associated with each node 102 are used for calculating the node's output, with an activation function being applied at each layer $104_1, \ldots, 104_M$.

As understood by those skilled in the art, backward propagation refers to the calculation of the gradient of neural network parameters by traversing the neural network in reverse order, from the output layer $104_{M+1}$ to the input layer $104_0$. Specifically, in the backward propagation stage, the output of the neural network 100 (as provided by the output layer $104_{M+1}$) is compared to a target output (not shown) and an error between the target output and the neural network's output is computed using a loss function. The error is then propagated through the layers $104_0, 104_1, \ldots, 104_M, 104_{M+1}$, gradients are computed (as derivatives of the loss function) with respect to all weights throughout the neural network 100, and the nodes' weights are adjusted (e.g., using optimization algorithms based on gradient descent) to correct for the error.

Figure 2A:
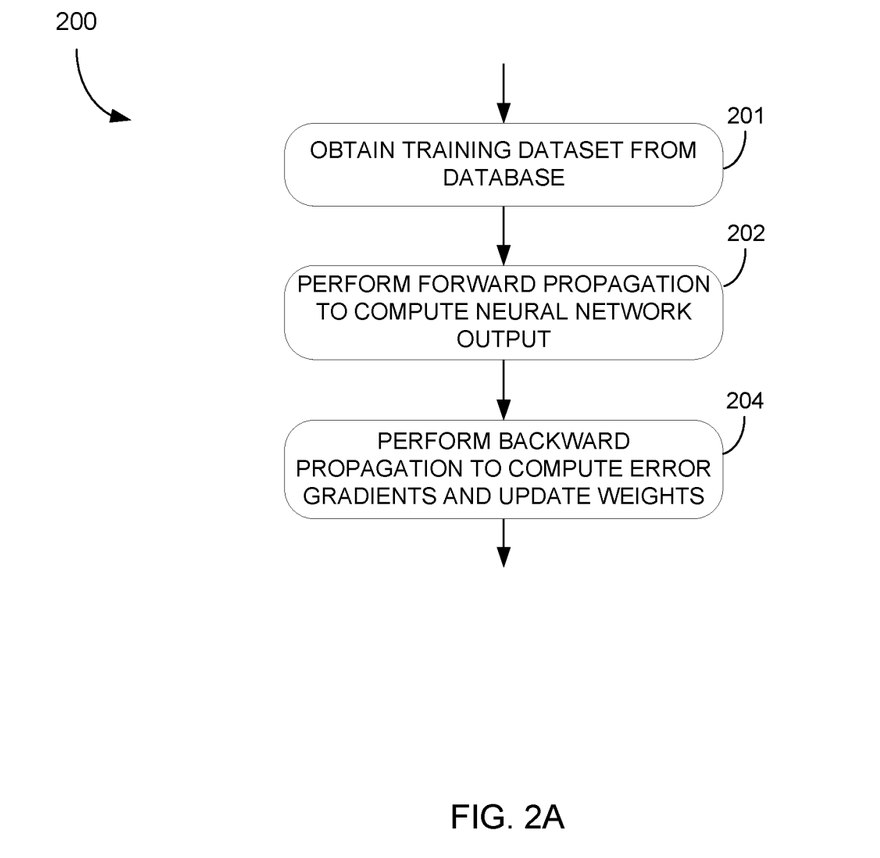
FIG. 2A is a flowchart of a method for training the neural network of FIG. 1, in accordance with an illustrative embodiment.
Figure 2B:
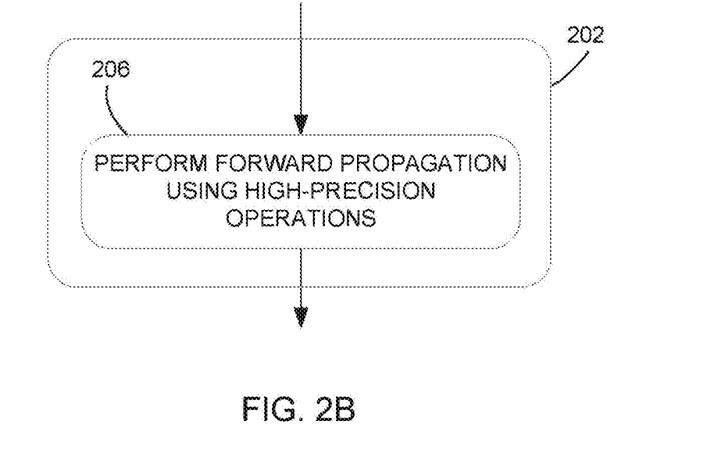
FIG. 2B is a flowchart of the step 202 of FIG. 2A of performing forward propagation of the neural network of FIG. 1, in accordance with an illustrative embodiment.
Figure 2C:
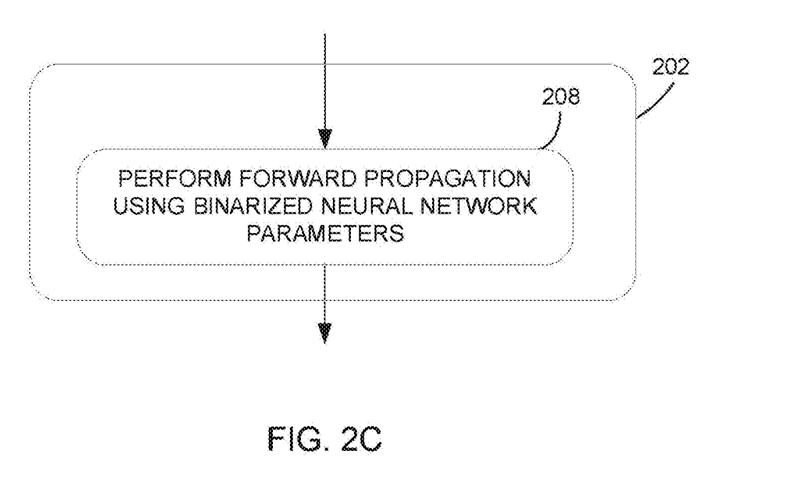
FIG. 2C is a flowchart of the step 202 of FIG. 2A of performing forward propagation of the neural network of FIG. 1, in accordance with another illustrative embodiment.

Referring now to FIG. 2A, a method of training a neural network, such as the neural network 100 of FIG. 1, will now be described. A training dataset, which is representative of new data for processing by the neural network 100, is first obtained from a database or other suitable storage means (step 201). The training dataset may comprise any suitable number (e.g., thousands) of training samples, which may be of any suitable type including, but not limited to, digital images and characters. At step 202, forward propagation is performed to compute the neural network's output. Backward propagation is then performed at step 204 to compute error gradient(s) and update the weights of the neural network nodes. As illustrated in FIG. 2B, in one embodiment, for conventional neural networks, step 202 comprises performing forward propagation using high-precision operations (step 206). As illustrated in FIG. 2C, in another embodiment, for SCNNs, step 202 comprises performing forward propagation using binarized neural network parameters (step 208). In one embodiment, the neural network parameters (e.g., the values of all nodes, including input nodes, and the values of weights) are stochastically binarized (i.e. using stochastic computing) at step 208. Step 202 (particularly when applied to SCNNs) and step 204 will be described further below with reference to FIG. 3A, FIG. 3B, and FIG. 4.

As known to those skilled in the art, in stochastic computing (SC), computations are performed on stochastic streams, which are sequences of random bits representing a real number. Let $x \in \{0,1\}^N$ be a stochastic stream where N denotes the sequence length of the stochastic stream. In the unipolar format of stochastic streams, the real number $x \in [0,1]$ can be represented as a sequence of random bits such that:

$$\mathbb{E}[x] = x \tag{1}$$

where $\mathbb{E}[x]$ is the expected value of the stochastic stream x.

Stochastic streams may also be used to represent negative numbers in bipolar format. To represent the real number $x \in [-1,1]$ in the stochastic domain, the bipolar representation may be used, where:

$$\mathbb{E}[x] = (x+1)/2 \tag{2}$$

It should be noted that a real number with an absolute value of greater than one may also be represented as a stochastic stream by scaling the real number down to fit within the required range of either unipolar or bipolar format. In one embodiment, stochastic streams are generated using Linear Feedback Shift Registers (LFSRs) and comparators on dedicated hardware. For simulation purposes or software implementations, this may be done by sampling from the Bernoulli distribution function.

In SC, multiplications are performed using AND and XNOR logical gates in unipolar and bipolar stochastic streams, respectively. Stochastic additions can be performed using either OR logical gates or scaled adders. An OR gate can be used to perform a stochastic addition when its input values are small. A scaled adder may be realized as a two-input multiplexer (MUX) in SC, where its selector may be controlled with a stochastic stream with the probability of 0.5. As a result, the expected value for the output of the scaled adder with two stochastic streams a and b is scaled down by 2 and is equal to $(\mathbb{E}[a] + \mathbb{E}[b])/2$. To perform an addition with L inputs, a tree of multiple two-input MUXs may be required. As a result, it may be desirable to use long stochastic streams to overcome the precision loss imposed by Lx down scaling.

Integral stochastic stream was proposed as an alternative for conventional unipolar and bipolar formats to simplify the addition in stochastic DNNs. The integral stochastic stream is a sequence of integer numbers and an integral sequence may be generated by adding multiple unipolar/bipolar stochastic streams. It should be noted that zeros in bipolar streams are treated as "−1" when generating integral streams. In integral representation, the average value of the sequence is equal to its corresponding real value. For instance, 11.25 can be represented as $\{1,1,1,0,1,0,1,1\}(0.5) + \{1,1,1,0,1,1,1,1\}(0.75)$ in bipolar format and $\{2,2,2,-2,2,0,2,2\}(1.25)$ in integral format. As will be discussed further below, it is proposed herein to use integral format of stochastic streams to represent the input of non-linear activation functions.

Generally, complex functions may be implemented in SC using linear finite-state machines (FSMs), e.g. up-down saturating counters. The output may be generated based on the comparison between the counter's value and a threshold. For instance, a stochastic tanh (Stanh) function with n states that generates bipolar streams may generate "1" when the counter's value is greater than n/2 and produce "0" otherwise. In SC-based implementations of DNNs, the input of the non-linear activation function is usually provided by scaled-adders. However, because scaled-adders decrease the precision of stochastic streams for a large number of inputs, it is proposed herein to alternatively use an integral SC adder and its FSM-based function (i.e., Integral Stochastic tanh (IStanh)), as will be described further below. This may in turn allow to use smaller sequence length when representing numbers with stochastic streams. As will also be discussed further below, the input of the IStanh function is in integral format whereas its output is in conventional SC bipolar format.

Figure 3A:
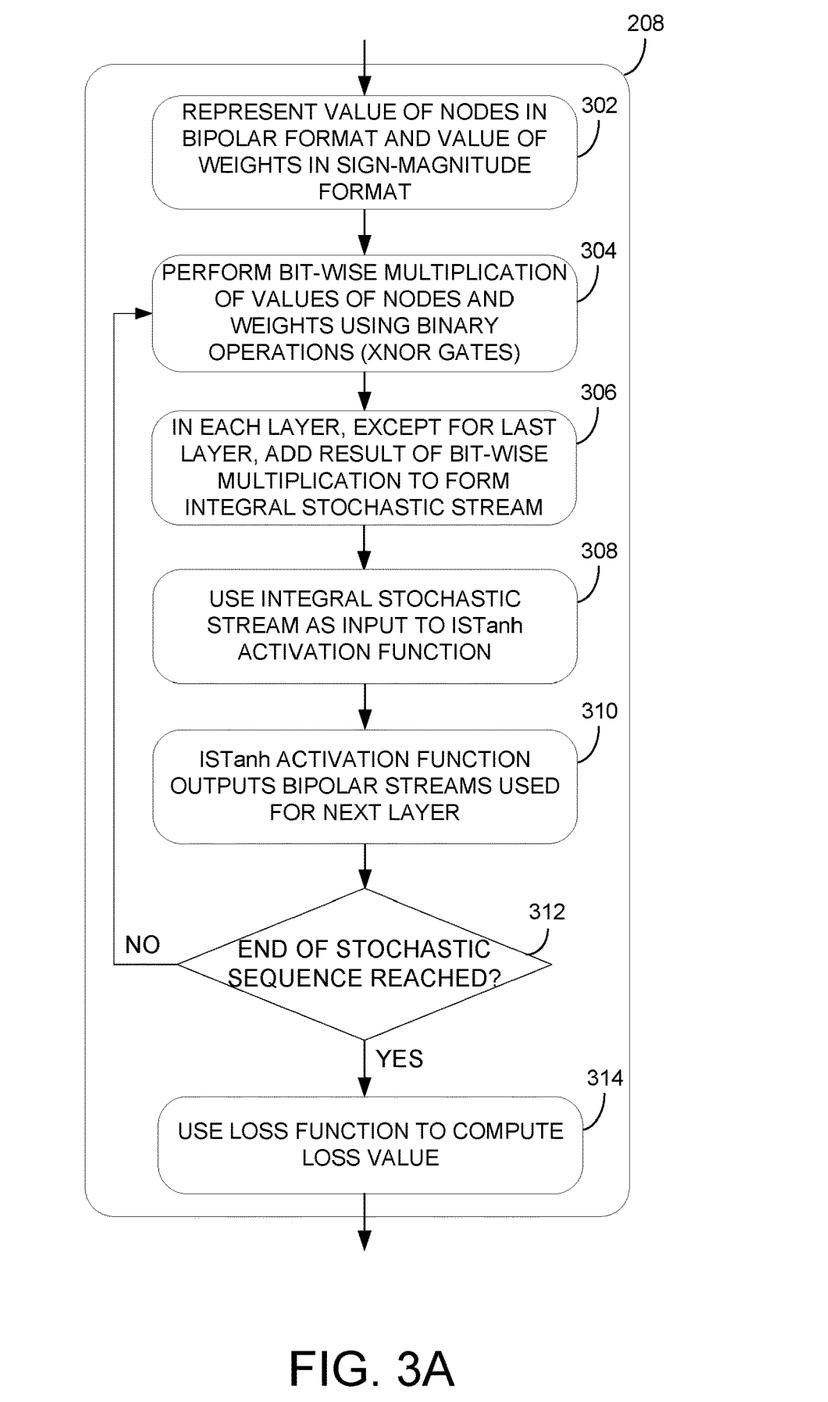
FIG. 3A is a flowchart of the step 208 of FIG. 2C of performing forward propagation of the neural network of FIG. 1, in accordance with an illustrative embodiment.

FIG. 3A illustrates the step 208 of performing forward propagation for a neural network, and particularly a SCNN, in accordance with another embodiment. In the embodiment of FIG. 3A, step 208 is performed for a sequence length greater than 1. For instance, FIG. 3A is particularly applicable for a sequence length of 16. In the embodiment of FIG. 3A, step 208 is performed stochastically and comprises, at step 302, representing the values of the SCNN nodes in bipolar format and representing the values of the SCNN weights in sign-magnitude (SM) format. For this purpose, the SM representation of stochastic streams may be used to enhance the accuracy of SCNN computations, where, to represent the real number $x \in [-1,1]$ in the SM stochastic domain, the absolute value of x is calculated and a stochastic sequence is generated using unipolar format. The sign value of x is also preserved for later computations. As a result, the length of SM streams is one bit longer than in both the bipolar and the unipolar formats. Binary multiplication between two values represented with SM format may then only require two gate operations, namely an AND gate operation to calculate the result of multiplications and an XOR gate operation to calculate the sign values of the multiplications.

At step 304, a sample is taken stochastically from all the inputs and the weights of the SCNN, where the samples of the input data and weights may be respectively denoted as $x^b$ and $w^b$, and are respectively represented using bipolar and SM format at step 302, as discussed above. A bit-wise multiplication between the bipolar and SM stochastic streams may be performed (i.e. the samples $x^b$ and $w^b$ are multiplied) using binary operations, with XNOR gates.

At step 306, the result of the multiplications is added in each layer (except for the output layer $104_{M+1}$) to form an integral stochastic stream. In other words, the sum of products forms an element in the integral stochastic stream. The integral stochastic stream is then used as an input to a non-linear activation function (step 308). Each element in the SM stream is illustratively represented with two bits (i.e. ternary), namely the sign bit and the magnitude bit, and there is conventionally only one sign bit in each SM stream. However, the result of the multiplication between the SM and bipolar formats is an SM stream that has a sign value for each magnitude bit of the sequence. Consequently, the integral stochastic stream obtained from the addition of generated SM streams is illustratively used as an input to the IStanh function. In one embodiment, the IStanh function is indeed used as the activation function of the proposed SCNN. The IStanh function, which may be implemented using FSMs, can take multiple steps to change its state based on its integral stochastic input. Using the IStanh function, at any given layer of the SCNN, the total number of nodes in the previous layer denotes the maximum range of the integral stochastic input sequence. It should however be understood that other suitable stochastic activation functions may apply, provided these stochastic activation functions can process integral stochastic sequences. For example, the Stochastic clamped Relu function and the Stochastic Sigmoid function may be used.

At step 310, the IStanh activation function outputs bipolar streams to be used for the next layer of the SCNN. In particular, the output of the IStanh function, which may be denoted as $h^b$, is represented in bipolar format and is multiplied with weights $w^b$ from the next layer. This procedure continues until the last layer (i.e. the output layer $104_{M+1}$, which does not have any non-linear activation function) of the SCNN is reached and the sum of products (i.e. the output of layer $104_{M+1}$, which may be denoted as y and represented in integral format), is calculated. Steps 304, 306, 308, and 310 are repeated N times, for the length (N) of the stochastic sequence. For this purpose, at step 312, an assessment is performed as to whether the end of the stochastic sequence has been reached (i.e. whether the last element of the stochastic stream has passed through the SCNNs and reached the output nodes of the output layer $104_{M+1}$). If this is not the case, steps 304, 306, 308, and 310 are repeated. In other words, a SCNN having an L-bit sequence length requires L cycles to perform forward propagation.

From the above, it can be seen that, for an SCNN, it is proposed herein to represent nodes (including inputs) of the SCNN with bipolar streams, weights with SM streams, the input of the activation function (IStanh) with integral streams, and the output of the activation function with bipolar stochastic streams.

H and $Y_o$ are the summation of $h^b$ and y, respectively. The value of H is divided by N to obtain the real value of nodes in each layer as it is used in the backward propagation of the gradients. $Y_o$ is also divided by N to obtain the real value of the outputs to be used in the loss function (discussed further below). The length of stochastic streams (i.e., N) is a power of two and the divisions can be implemented with shift operations. At the end, the argmax function may be used to return a classification result $Y_p$.

Once it is determined at step 312 that the end of the stochastic sequence has been reached, a loss function is used at step 314 to compute a loss value. In particular, the loss of each output node is minimized separately using a Hinge-Loss function expressed as:

$$\text{HingeLoss} = \max(0, 1 - y_o y_t) \quad (3)$$

where $y_t \in \{-1, +1\}$ is the true classification label of the input data and $y_o$ is the value of the output layer $104_{M+1}$.

The partial derivative of the Hinge-loss function can be calculated with respect to the output $y_o$ using:

$$\frac{\partial \text{Loss}}{\partial y_o} = \begin{cases} -y_t & \text{if } y_o y_t < 1 \\ 0 & \text{otherwise} \end{cases} \quad (4)$$

It should be noted that the minimization of the Hinge-Loss function may not require any real value (i.e., high-precision) multiplication as $$\frac{\partial \text{Loss}}{\partial y_o} \in \{-1, 0, 1\}.$$

Although reference is made herein to the Hinge-loss function being used as the loss function at step 314 (because the gradient of the Hinge-loss function with respect to its output is inherently ternary), it should be understood that any other suitable loss function(s) may apply, provided the gradients of these loss functions are binarized (e.g., using the sign function or stochastic computing). The method proposed herein may indeed be applied to other loss function(s) by stochastically taking a sample from the derivative of the loss function with respect to the output $y_o$.

Figure 3B:
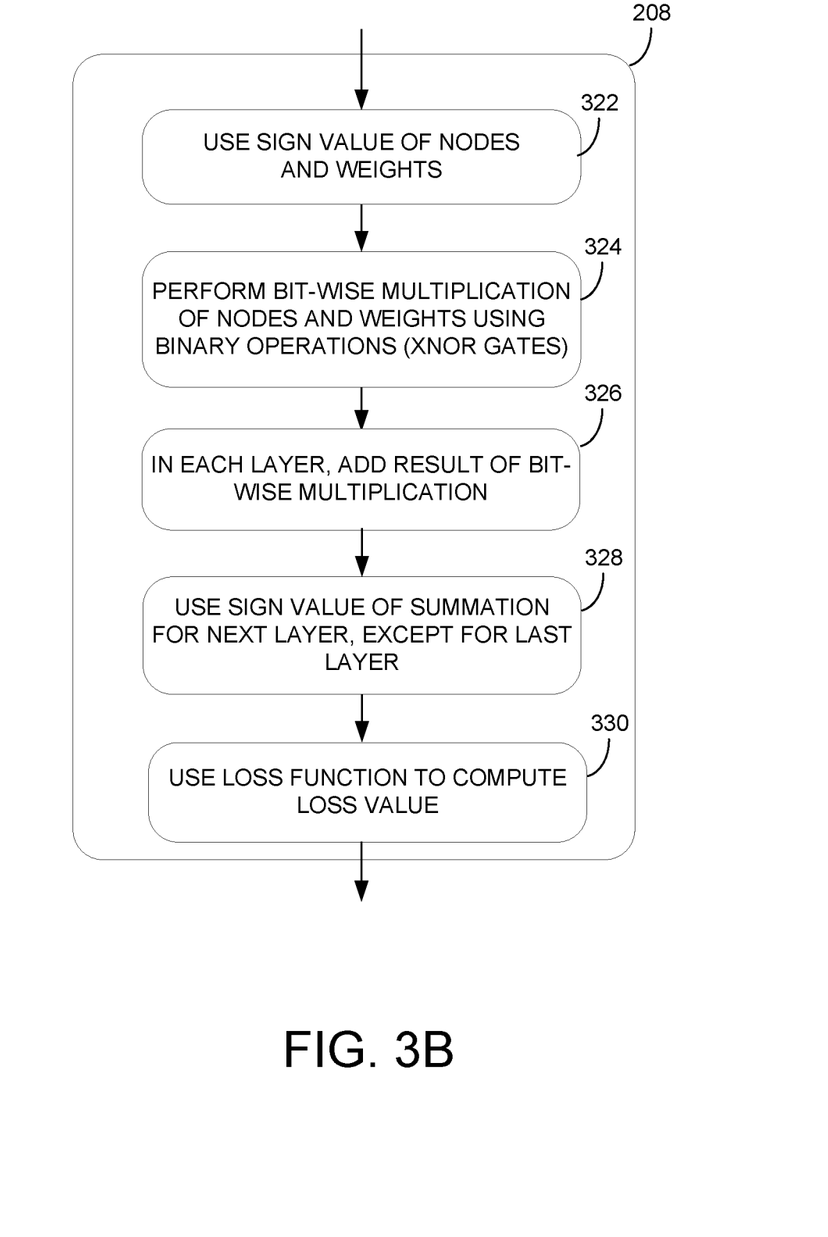
FIG. 3B is a flowchart of the step 208 of FIG. 2C of performing forward propagation of the neural network of FIG. 1, in accordance with another illustrative embodiment.

Moreover, although reference is made herein to stochastic binarization being used during forward propagation of an SCNN (i.e. at step 208), in an alternate embodiment, deterministic binarization may be used to perform forward propagation of a deterministic binarized neural network (BNN). In this case, the BNN uses the sign value of nodes and weights and employs the sign function as the activation function. Unlike for the SCNN described above with reference to FIG. 3A, the first layer of the BNN is not binarized. This is shown in FIG. 3B, which illustrates the step 208 of performing forward propagation in accordance with yet another embodiment. In the embodiment of FIG. 3B, step 208 is performed for a sequence length of 1. In the embodiment of FIG. 3B, step 208 is performed deterministically and comprises step sign values of nodes and weights at step 322. Bit-wise multiplication of nodes and weights is then performed at step 324 using binary operations (where a binary multiplier is realized using XNOR gates). The next step 326 is then to add the result of the bit-wise multiplication for each layer. The sign value of the summation is then used for the next layer, except for the last layer, at step 328. A loss function (e.g., the Hinge-loss function discussed above) is then used to compute a loss value at step 330.

Figure 4:
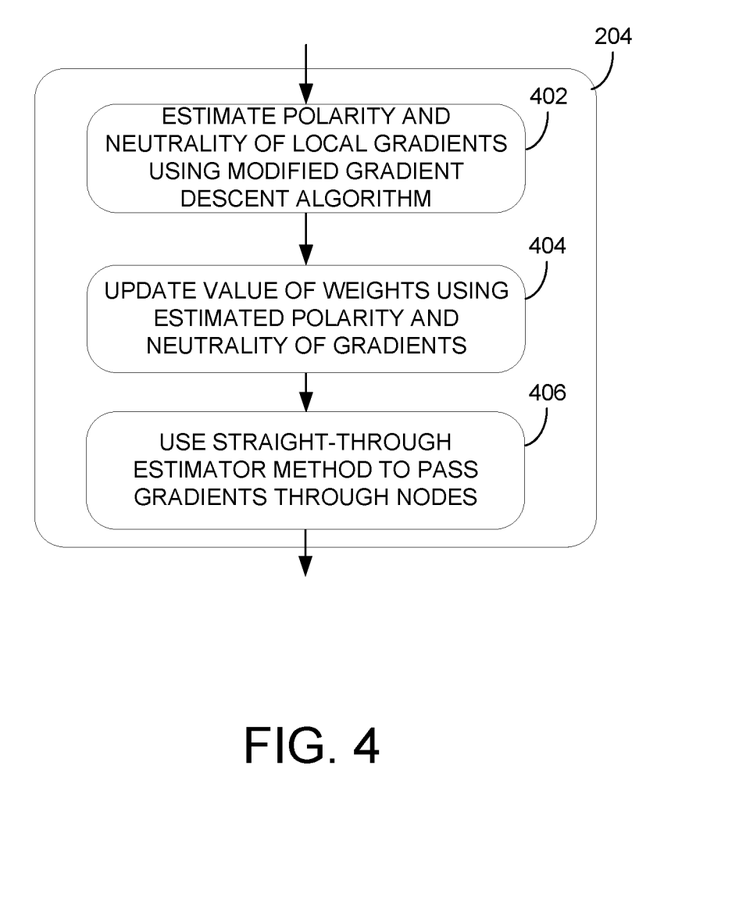
FIG. 4 is a flowchart of the step 204 of FIG. 2A of performing backward propagation of the neural network of FIG. 1, in accordance with an illustrative embodiment.

Referring now to FIG. 4, the step 204 of performing backward propagation to compute error gradients and update weights of the neural network (reference 100 in FIG. 1) will now be described. Step 204 may apply to conventional neural networks as well as SCNNs. In one embodiment, step 204 is performed using ternary operations (where a ternary multiplier is realized using two gates, namely AND gates and XOR gates). As will be understood by a person skilled in the art, the following two challenges exist when performing backward propagation in neural networks (and particularly in SCNNs), using the gradient descent (GD) method (discussed further below): (1) the precision of gradients drops significantly during backward propagation; and (2) the derivative of stochastic activation functions cannot be accurately calculated. In order to address these issues, it is first proposed herein to estimate the polarity and neutrality of the local gradients during backward propagation (step 402), rather than calculating the precise value of the gradients. The value of the neural network weights is then updated (step 404) using the estimated polarity and neutrality of the gradients, as obtained at step 402. In one embodiment, the weights are updated by a substantially small margin (i.e. using a substantially small learning rate) at step 404.

It is also proposed herein to use a so-called "straight-through estimator" method to pass the gradients through the nodes (step 406) during backward propagation. This may be achieved using the following equation:

$$\partial h = 1_{|H| < 1} \quad (5)$$

Where $\partial h$ is the derivative of the activation functions with respect to their inputs.

The straight-through estimator blocks the gradients when passing through a saturated node, i.e. a node with an absolute value of 1. In one embodiment, the absolute value of the nodes remains lower than or equal to 1 for SCNNs since the activation functions generate bipolar outputs.

The backward propagation is illustratively performed once for each input, meaning that, in a neural network 100 (e.g., a SCNN) having an L-bit sequence length, the backward propagation is only performed once.

In order to estimate the polarity and neutrality of the gradients at step 402, a modified GD algorithm may be used, as will be discussed further below.

As known to those skilled in the art, the GD algorithm is one of the most commonly-used algorithms for training DNNs. For DNNs with a differentiable loss function $\mathbb{L}$, the local gradient of the $j^{th}$ neuron in the $\ell^{th}$ layer is defined by:

$$g_j^{(\ell)} = \begin{cases} \dfrac{\partial \mathbb{L}}{\partial f(v_j^{(\ell)})} & \text{output layer} \\ f'(v_j^{(\ell)}) \sum_m g_j^{(\ell+1)} w_{m,j}^{(\ell)} & \text{middle layers} \end{cases} \quad (6)$$

where $g_j^{(=)}$ is the local gradient of the $j^{th}$ neuron in the $=^{th}$ layer, $f$ is a non-linear activation function, and $w_{m,j}^f$ is the weight that connects the $m^{th}$ neuron from the $=+1^{th}$ to the $j^{th}$ neuron in the $=^{th}$ layer. The parameter $v_j^{(=)}$ is expressed as:

$$v_j^{(\ell)} = \sum_k w_{j,k}^{(\ell-1)} f(v_j^{(\ell-1)}) \quad (7)$$

where $f(v_j^{(=-1)})$ is substituted with the input nodes for the first layer of the neural network 100 (e.g., the SCNN).

The gradients with respect to the weights are calculated as:

$$\nabla w_{j,k}^{(=)} = g_j^{(=)} f(v_j^{(=-1)}) \quad (8)$$

It should be understood that the matrix multiplications in equations (6), (7), and (8) may be replaced with convolution operations for backward propagation in CNNs.

The weights are then updated using their current values $w^t$, learning rate $\alpha$, and the gradients obtained from equation (8) as follows:

$$w^{t+1} = w^t - \alpha \nabla w \quad (9)$$

In the modified GD algorithm proposed herein, the sign value of the neural network weights and nodes is used to replace the real values of the weights and nodes (referred to as "deterministic binarization" of weights and nodes, as described herein above), with the exception of the nodes of the first layer $104_0$ (i.e., the input nodes). The value of the weights of the first layer $104_0$ is updated with the real value of the input nodes of the neural network 100. As a result of equation (4), the equations (6) and (8) can be rewritten as:

$$g_j^{(\ell)} = \begin{cases} -y_{t_{(y_o y_t < 1)}} \\ 1_{|f(v_j^{(\ell)})|<1} \operatorname{sign}\left(\sum_m g_j^{(\ell+1)} \operatorname{sign}(w_{m,j}^{(\ell)})\right) \end{cases} \quad (10)$$

and $$\nabla w_{j,k}^{(=)} = g_j^{(=)} \operatorname{sign}(f(v_j^{(=-1)})) \quad (11)$$

in which multiplications are performed using binary or ternary operations.

When using deterministic binarization to estimate the gradients, small (e.g., 0.0001) and large (e.g., 0.9) values of weights and nodes have the same impact. To better estimate the gradients, stochastic binarization may be employed during backward propagation. More specifically, one sample is stochastically taken from weights and nodes when calculating the gradients during backward propagation. In other words, using stochastic binarization, the real values of the weights and nodes are converted to two-bit ternary values.

To update the weights at step 404, the learning rate in equation (9) may also be considered to be a power-of-two number so that it can be implemented with shift operations. It should be noted that the value of the learning rate illustratively determines the precision to be used for the real value of the weights stored in memory. For instance, for a learning rate of $1/2^N$, only $N+1$ bits (including 1 sign bit and N fractional bits) are adequate for the weight as the learning rate may only change the N most significant fractional bits. It should also be understood that other adaptive learning rates including, but not limited to, AdaGrad and AdaDelta, may be used when updating weights at step 404.

Figure 5A:
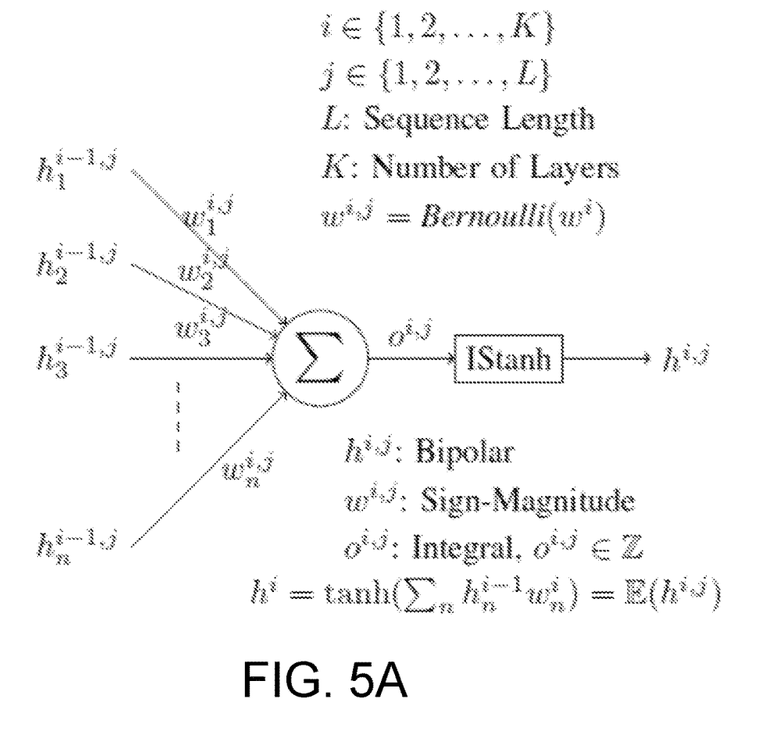
FIG. 5A is a schematic diagram of the forward propagation procedure of FIG. 3A, in accordance with an illustrative embodiment.
Figure 5B:
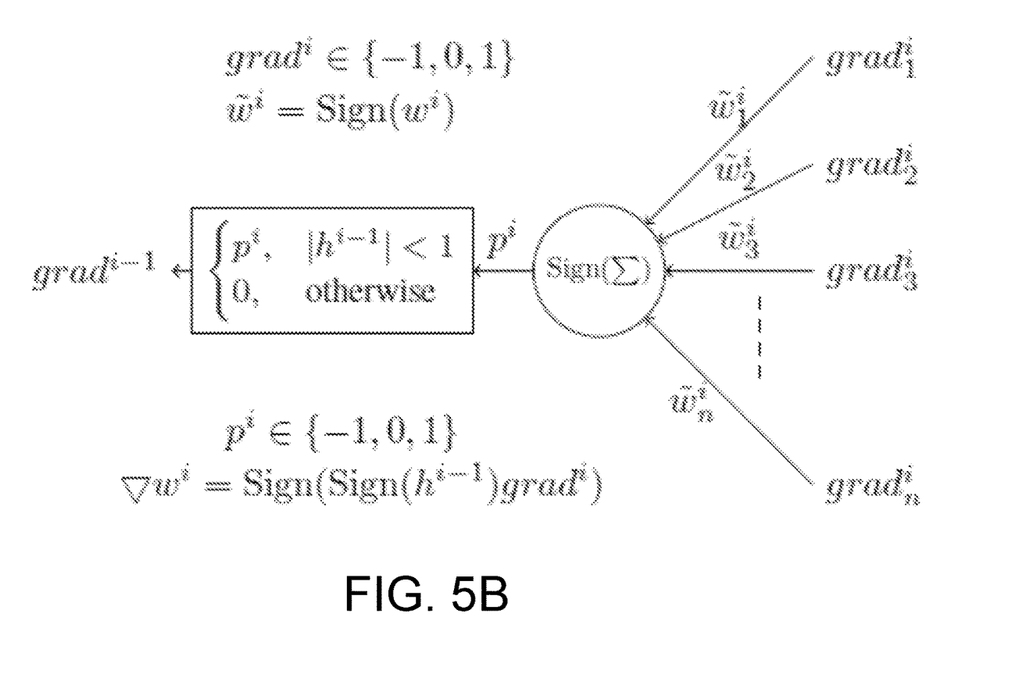
FIG. 5B is a schematic diagram of the backward propagation procedure of FIG. 4, in accordance with an illustrative embodiment.

FIG. 5A illustrates the forward propagation procedure described above with reference to FIG. 3A (i.e. for an SCNN) and FIG. 5B illustrates the backward propagation procedure described above with reference to FIG. 4.

As will be discussed further below, Modified National Institute of Standards and Technology (MNIST) datasets may be used for experiments without any preprocessing. As a result, inputs to the neural network 100 are positive and the sign value of the inputs does not provide any useful information. It is therefore proposed herein to have an exception for the first layer, where input values are represented using N=8 bits during backward propagation.

In one embodiment, in order to assess the performance of the methods and systems proposed herein, a conventional CNN was trained using different datasets. For this purpose, four image classification benchmarks were used, namely MNIST, Fashion-MNIST, Kuzushiji-MNIST, and Street View House Number (SVHN). The MNIST dataset is a dataset of 60,000 small square 28×28-pixel grayscale images of handwritten single digits between 0 and 9. Fashion-MNIST is a dataset of Zalando's article images consisting of a training set of 60,000 examples and a test set of 10,000 examples, with each example being a 28×28 grayscale image associated with a label from 10 classes. Kuzushiji-MNIST (or KMNIST) is a drop-in replacement for the MNIST dataset, provided in the original MNIST format as well as a so-called NumPy format. The KMNIST dataset contains 10 classes of Hiragana characters with a resolution of 28×28 (grayscale) similar to MNIST, containing in total 70,000 images: 60,000 for training and 10,000 for testing. Since the number of classes is restricted to 10 with MNIST, one character is chosen to represent each of the 10 rows of Hiragana when creating KMNIST.

SVHN is a real-world image dataset for developing machine learning and object recognition algorithms with minimal requirement on data preprocessing and formatting. SVHN can be seen as similar to MNIST (e.g., the images are of small cropped digits) but incorporates an order of magnitude more labeled data (over 600,000 digit images) and comes from a significantly harder, unsolved, real world problem (recognizing digits and numbers in natural scene images). SVHN is obtained from house numbers in Google Street View images. Specifically, SVHN comprises 10 classes, with one (1) class for each digit, where digit '1' has label 1, digit '9' has label 9, and digit '0' has label 10. SVHN also has 73257 digits for training, 26032 digits for testing, and 531131 additional (less difficult) samples to use as extra training data.

The training method described herein was applied on the same CNN to evaluate its training capabilities using the aforementioned datasets. A CNN having two (2) convolution layers with 32 filters and 64 (3 by 3) filters, respectively, followed by two (2) fully connected layers having a size of 128 and 10 neurons, respectively was used. During the training phase of the CNN, the forward propagation is performed in high-precision and the backward propagation is performed using the gradient estimation method using ternary operations described herein. Furthermore, the inference is performed in high-precision. AdaDelta was used as an adaptive learning rate to update the weights after estimating the gradients polarity and neutrality using the training method described herein.

In another embodiment, in order to assess the performance of the methods and systems proposed herein, a SCNN was trained directly, without any preprocessing (i.e. without utilizing pre-trained parameters from conventional neural networks), on a MNIST dataset containing 60 K of training samples and 10 K of test samples. The performance of the SCNN was evaluated across different sequence lengths including, but not limited to, 1, 2, 4, 8, 32, 64, 128, 256, 512, and 1024. In one experiment, a fully-connected neural network (FCNN) with three hidden layers of size 1024 is trained on a MNIST dataset using the conventional GD algorithm (performs both the inference and training computations in high-precision) and the training method proposed herein (using the dropout technique and stochastic binarization during backward propagation). In another experiment, a Binary-Net comprising three fully connected hidden layers with 1024 nodes in each layer is trained using the training method proposed herein (i.e. the gradient estimation method).

Simulation results (from training the CNN or the SCNN in the manner described above) show that the training methods proposed herein enable to directly train SCNNs that result in a higher performance accuracy and better computational latency compared to SCNNs that extract their parameters from high-precision networks. Moreover, the training method proposed herein enables to replace all high-precision multipliers with ternary operations, enabling low-cost on-chip learning. For instance, in one embodiment, a single high-precision multiplier (i.e., a 16-bit multiplier) requires 3116 µm$^2$ in Taiwan Semiconductor Manufacturing Company (TSMC) 65-nm Complementary Metal Oxide Semiconductor (CMOS) technology while a ternary multiplier requires 269 times less silicon area. More specifically, in one embodiment, using the systems and methods described herein, high-precision computations required to perform forward and backward propagation may be replaced with binary or ternary operations without imposing additional circuits on the network, as opposed to existing techniques. In addition, in one embodiment, using the stochastic representation described herein may allow to perform computations more accurately while using shorter sequence lengths, compared to existing techniques.

Figure 6:
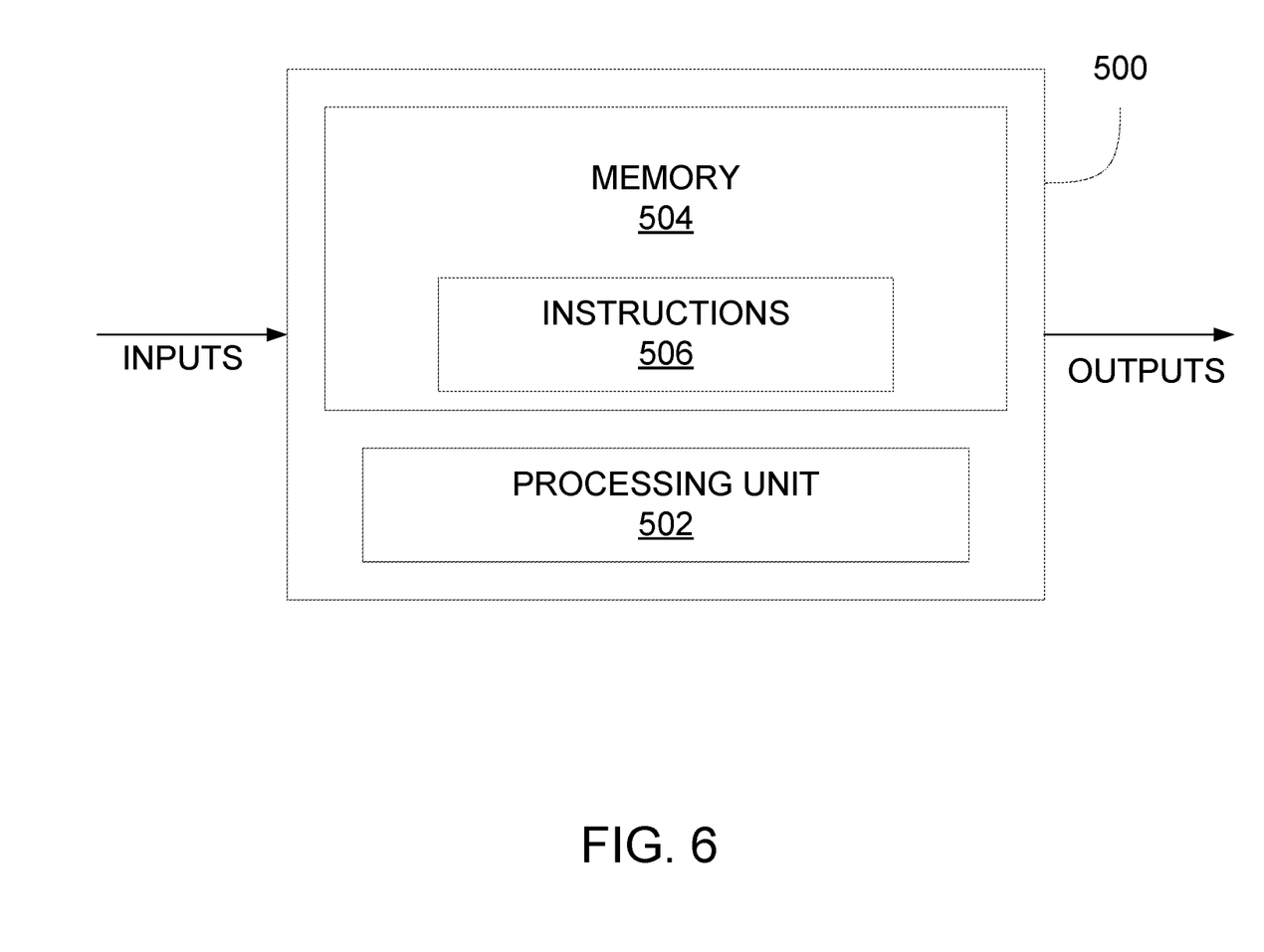
FIG. 6 is a schematic diagram of an example computing system for implementing the method of FIG. 2A, in accordance with an illustrative embodiment.

FIG. 6 is an example embodiment of a computing device (also referred to herein as an electronic device) 500 for implementing the neural network 100 described above with reference to FIG. 1. For instance, the computing device 500 may be provided as a neural networking engine configured to perform the method 200 described above with reference to FIG. 2A. The computing device 500 comprises a processing unit 502 and a memory 504 which has stored therein computer-executable instructions 506. The neural network 100 may therefore run on the processing unit 502, which is coupled to memory 504.

The processing unit 502 may comprise any suitable devices configured to cause a series of steps to be performed such that instructions 506, when executed by the computing device 500 or other programmable apparatus, may cause the functions/acts/steps specified in the method described herein to be executed. The processing unit 502 may comprise, for example, any type of general-purpose microprocessor or microcontroller, a digital signal processing (DSP) processor, a CPU, an integrated circuit, an FPGA, a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It will be understood by those skilled in the art that the present embodiments are provided by a combination of hardware and software components, with some components being implemented by a given function or operation of a hardware or software system. Data paths may be implemented by data communication within a computer application or operating system. The structure illustrated is thus provided for efficiency of teaching the present embodiment.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A computer-implemented method of training a neural network, the neural network comprising a plurality of interconnected nodes arranged in a plurality of layers and having a plurality of weights associated therewith, the method comprising:
   obtaining, at a computing device, a training dataset from a database;
   performing, at the computing device, a forward propagation on the training dataset to produce an output of the neural network; and
   performing, at the computing device, a backward propagation on the output of the neural network by:
      computing gradients of the neural network exclusively using ternary operations that estimate a polarity and a neutrality of gradients of the neural network using ternary values represented with two bits, the ternary operations performed by a ternary multiplier realized using an AND gate and an XOR gate, and
      updating the plurality of weights using the polarity and the neutrality as estimated.

2. The method of claim 1, wherein performing the backward propagation comprises obtaining an estimation of the polarity and of the neutrality of a local gradient of each node in each one of the plurality of layers and updating values of the plurality of weights using the estimation.

3. The method of claim 1, wherein estimating the polarity and the neutrality of the gradients of the neural network comprises using stochastic binarization to convert real values of the plurality of nodes and of the plurality of weights to the two-bit ternary values.

4. The method of claim 1, wherein estimating the polarity and the neutrality of the gradients of the neural network comprises using deterministic binarization, except for a first one of the plurality of layers, to replace real values of the plurality of nodes and of the plurality of weights with sign values of the plurality of nodes and of the plurality of weights.

5. The method of claim 1, further comprising using a straight-through estimator to pass the gradients through the plurality of nodes, the straight-through estimator configured to block the gradients when passing through a saturated one of the plurality of nodes.

6. The method of claim 1, wherein performing the forward propagation comprises performing the forward propagation of a stochastic computing-based neural network (SCNN) using binarized representations of the plurality of weights and nodes.

7. The method of claim 6, wherein performing forward propagation of the SCNN comprises, for a sequence length greater than one, performing stochastic binarization by:
representing values of the plurality of nodes in bipolar format;
representing values of the plurality weights in sign-magnitude format;
performing, using binary operations, a bit-wise multiplication of the values of the nodes and weights;
in each one of the plurality of layers, except for a last one of the plurality of layers, summing a result of the bit-wise multiplication to form an integral stochastic stream;
using the integral stochastic stream as an input to a non-linear activation function, obtaining an output of the activation function, and using the output of the activation function for a next one of the plurality of layers; and
responsive to determining that an end of the stochastic stream has been reached, using a loss function to compute a loss value associated with each one of the plurality of nodes.

8. The method of claim 7, wherein the integral stochastic stream is used as an input to an ISTanh (Integral Stochastic Tanh) activation function, and further wherein the loss function used to compute the loss value associated with each one of the plurality of nodes is a Hinge-Loss function.

9. The method of claim 6, wherein performing forward propagation of the SCNN comprises, for a sequence length of one, performing deterministic binarization by:
using sign values of the plurality of nodes;
using sign values of the plurality weights;
performing, using binary operations, a bit-wise multiplication of the values of the nodes and weights;
in each one of the plurality of layers, performing a summation of a result of the bit-wise multiplication;
using a sign value of the summation for a next one of the plurality of layers, except for a last one of the plurality of layers; and
using a loss function to compute a loss value associated with each one of the plurality of nodes.

10. An electronic device for training a neural network, the neural network comprising a plurality of interconnected nodes arranged in a plurality of layers and having a plurality of weights associated therewith, the electronic device comprising:
at least one processing unit; and
a non-transitory memory communicatively coupled to the at least one processing unit and comprising computer-readable program instructions executable by the at least one processing unit for:
obtaining a training dataset;
performing a forward propagation on the training dataset to produce an output of the neural network; and
performing a backward propagation on the output of the neural network by:
computing gradients of the neural network exclusively using ternary operations that estimate a polarity and a neutrality of gradients of the neural network using ternary values represented with two bits, the ternary operations performed by a ternary multiplier realized using an AND gate and an XOR gate, and
updating the plurality of weights using the polarity and the neutrality as estimated.

11. The electronic device of claim 10, wherein the program instructions are executable by the at least one processing unit for performing the backward propagation comprising obtaining an estimation of the polarity and of the neutrality of a local gradient of each node in each one of the plurality of layers and updating values of the plurality of weights using the estimation.

12. The electronic device of claim 10, wherein the program instructions are executable by the at least one processing unit for estimating the polarity and the neutrality of the gradients of the neural network comprising using stochastic binarization to convert real values of the plurality of nodes and of the plurality of weights to the two-bit ternary values.

13. The electronic device of claim 10, wherein the program instructions are executable by the at least one processing unit for estimating the polarity and the neutrality of the gradients of the neural network comprising using deterministic binarization, except for a first one of the plurality of layers, to replace real values of the plurality of nodes and of the plurality of weights with sign values of the plurality of nodes and of the plurality of weights.

14. The electronic device of claim 10, wherein the program instructions are executable by the at least one processing unit for using a straight-through estimator to pass the gradients through the plurality of nodes, the straight-through estimator configured to block the gradients when passing through a saturated one of the plurality of nodes.

15. The electronic device of claim 10, wherein the program instructions are executable by the at least one processing unit for performing the forward propagation comprising performing the forward propagation of a stochastic computing-based neural network (SCNN) using binarized representations of the plurality of weights and nodes.

16. The electronic device of claim 15, wherein the program instructions are executable by the at least one processing unit for performing the forward propagation comprising, for a sequence length greater than one, performing stochastic binarization by:
representing values of the plurality of nodes in bipolar format;
representing values of the plurality weights in sign-magnitude format;
performing, using binary operations, a bit-wise multiplication of the values of the nodes and weights;

in each one of the plurality of layers, except for a last one of the plurality of layers, summing a result of the bit-wise multiplication to form an integral stochastic stream;

using the integral stochastic stream as an input to a non-linear activation function, obtaining an output of the activation function, and using the output of the activation function for a next one of the plurality of layers; and responsive to determining that an end of the stochastic stream has been reached, using a loss function to compute a loss value associated with each one of the plurality of nodes.

17. The electronic device of claim 16, wherein the program instructions are executable by the at least one processing unit for using the integral stochastic stream as an input to an ISTanh (Integral Stochastic Tanh) activation function, and for using a Hinge loss function to compute the loss value associated with each one of the plurality of nodes.

18. The electronic device of claim 15, wherein the program instructions are executable by the at least one processing unit for performing the forward propagation comprising, for a sequence length of one, performing deterministic binarization by:

using sign values of the plurality of nodes;

using sign values of the plurality weights;

performing, using binary operations, a bit-wise multiplication of the values of the nodes and weights;

in each one of the plurality of layers, performing a summation of a result of the bit-wise multiplication;

using a sign value of the summation for a next one of the plurality of layers, except for a last one of the plurality of layers; and using a loss function to compute a loss value associated with each one of the plurality of nodes.

19. A non-transitory computer readable medium having stored thereon program code executable by at least one processor for:

obtaining a training dataset from a database;

performing a forward propagation on the training dataset to produce an output of a neural network, the neural network comprising a plurality of interconnected nodes arranged in a plurality of layers and having a plurality of weights associated therewith; and performing a backward propagation on the output of the neural network by:

computing gradients of the neural network exclusively using ternary operations that estimate a polarity and a neutrality of gradients of the neural network using ternary values represented with two bits, the ternary operations performed by a ternary multiplier realized using an AND gate and an XOR gate, and updating the plurality of weights using the polarity and the neutrality as estimated.

* * * * *